US011120700B2

(12) United States Patent
Verma et al.

(10) Patent No.: US 11,120,700 B2
(45) Date of Patent: Sep. 14, 2021

(54) LIVE PERSONALIZATION OF MASS CLASSROOM EDUCATION USING AUGMENTED REALITY

(71) Applicant: International Business Machines Corporation, Armonk, NY (US)

(72) Inventors: Pramod Verma, Fairfax, VA (US); Rachel Leekin, White Plains, NY (US); Seema Nagar, Geddelahalli (IN); Kuntal Dey, Vasant Kunj (IN)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 16/382,037

(22) Filed: Apr. 11, 2019

(65) Prior Publication Data
US 2020/0327816 A1 Oct. 15, 2020

(51) Int. Cl.
G09B 5/06 (2006.01)
H04N 7/15 (2006.01)
G06T 19/00 (2011.01)
G09B 5/14 (2006.01)

(52) U.S. Cl.
CPC .............. G09B 5/06 (2013.01); G06T 19/006 (2013.01); G09B 5/14 (2013.01); H04N 7/157 (2013.01)

(58) Field of Classification Search
CPC .......... G09B 5/06; G09B 5/14; G06T 19/006; H04N 7/157
See application file for complete search history.

(56) References Cited

U.S. PATENT DOCUMENTS

| 2007/0255805 A1* | 11/2007 | Beams ............... G09B 7/00 709/218 |
| 2014/0098138 A1 | 4/2014 | Dogra et al. |
| 2014/0120516 A1* | 5/2014 | Chiang ............... G09B 5/02 434/362 |
| 2015/0123966 A1 | 5/2015 | Newman |
| 2015/0310751 A1 | 10/2015 | Tolia |

(Continued)

FOREIGN PATENT DOCUMENTS

| CN | 104732826 A | 6/2015 |
| CN | 105844979 A | 8/2016 |

*Primary Examiner* — Justin S Lee
(74) *Attorney, Agent, or Firm* — Kunzler Bean & Adamson; Bruce R. Needham

(57) ABSTRACT

An apparatus for personalization of teaching material presented via AR devices includes a processor and a memory that stores executable code. The executable code includes code to deliver teaching material to an AR device of a teacher when the teacher is using the teaching material to teach one or more students. The teaching material includes generic teaching material in an unmodified form. The executable code includes code to create personalized teaching material for a student of the one or more students. The personalized teaching material includes the generic teaching material modified based on learning concepts in a profile of the student that the student has previously experienced. The executable code includes code to deliver the personalized teaching material to an AR device of the student. The teacher views the generic teaching material in the teacher's AR device and the student views the personalized teaching material in the student's AR device.

16 Claims, 7 Drawing Sheets

(56) References Cited

U.S. PATENT DOCUMENTS

| | | | |
|---|---|---|---|
| 2016/0188585 A1* | 6/2016 | Durham | G06F 3/011 |
| | | | 345/633 |
| 2018/0137685 A1 | 5/2018 | Montgomerie et al. | |
| 2019/0066529 A1* | 2/2019 | Grubbs | G06F 3/013 |
| 2019/0392725 A1* | 12/2019 | Zalkins | G09B 9/00 |
| 2020/0174630 A1* | 6/2020 | Rosenberg | G06F 3/0482 |
| 2020/0258420 A1* | 8/2020 | Kurani | G06N 3/008 |

* cited by examiner

LIVE PERSONALIZATION OF MASS CLASSROOM EDUCATION USING AUGMENTED REALITY

BACKGROUND

The subject matter disclosed herein relates to augmented reality for teaching and more particularly relates to customizing teaching material of students using augmented reality devices.

Augmented Reality ("AR") based education is an emerging area, though AR and different education technologies have been around for a while. New systems are emerging for enabling teachers to create learning material via AR, which may be faster to create compared to books, and to deliver remote education on AR devices of students.

SUMMARY

An apparatus for personalization of teaching material presented via AR devices is disclosed. A computer-implemented method and another apparatus also perform the functions of the apparatus. According to an embodiment of the present invention, the apparatus includes a processor and a memory that stores code executable by the processor. The code executable by the processor includes code to deliver teaching material to an AR device of a teacher in conjunction with the teacher using the teaching material to teach one or more students. The teaching material includes generic teaching material in an unmodified form. The code executable by the processor includes code to create personalized teaching material for a student of the one or more students. The personalized teaching material includes the generic teaching material modified based on learning concepts in a profile of the student that the student has previously experienced. The code executable by the processor includes code to deliver the personalized teaching material to an AR device of the student. The teacher views the generic teaching material in the AR device of the teacher and the student views the personalized teaching material in the AR device of the student.

A computer-implemented method includes delivering teaching material to an AR device of a teacher in conjunction with the teacher using the teaching material to teach one or more students. The teaching material includes generic teaching material in an unmodified form. The computer-implemented method includes creating personalized teaching material for a student of the one or more students. The personalized teaching material includes the generic teaching material modified based on learning concepts in a profile of the student that the student has previously experienced. The computer-implemented method includes delivering the personalized teaching material to an AR device of the student. The teacher views the generic teaching material in the AR device of the teacher and the student views the personalized teaching material in the AR device of the student.

A computer program product for personalization of teaching material presented via AR devices includes a computer readable storage medium having program instructions embodied therewith. The program instructions are executable by a processor to cause the processor to deliver teaching material to an augmented reality ("AR") device of a teacher in conjunction with the teacher using the teaching material to teach one or more students. The teaching material includes generic teaching material in an unmodified form. The program instructions are executable by a processor to cause the processor to create personalized teaching material for a student of the one or more students. The personalized teaching material includes the generic teaching material modified based on learning concepts in a profile of the student that the student has previously experienced. The program instructions are executable by a processor to cause the processor to deliver the personalized teaching material to an AR device of the student where the teacher views the generic teaching material in the AR device of the teacher and the student views the personalized teaching material in the AR device of the student.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
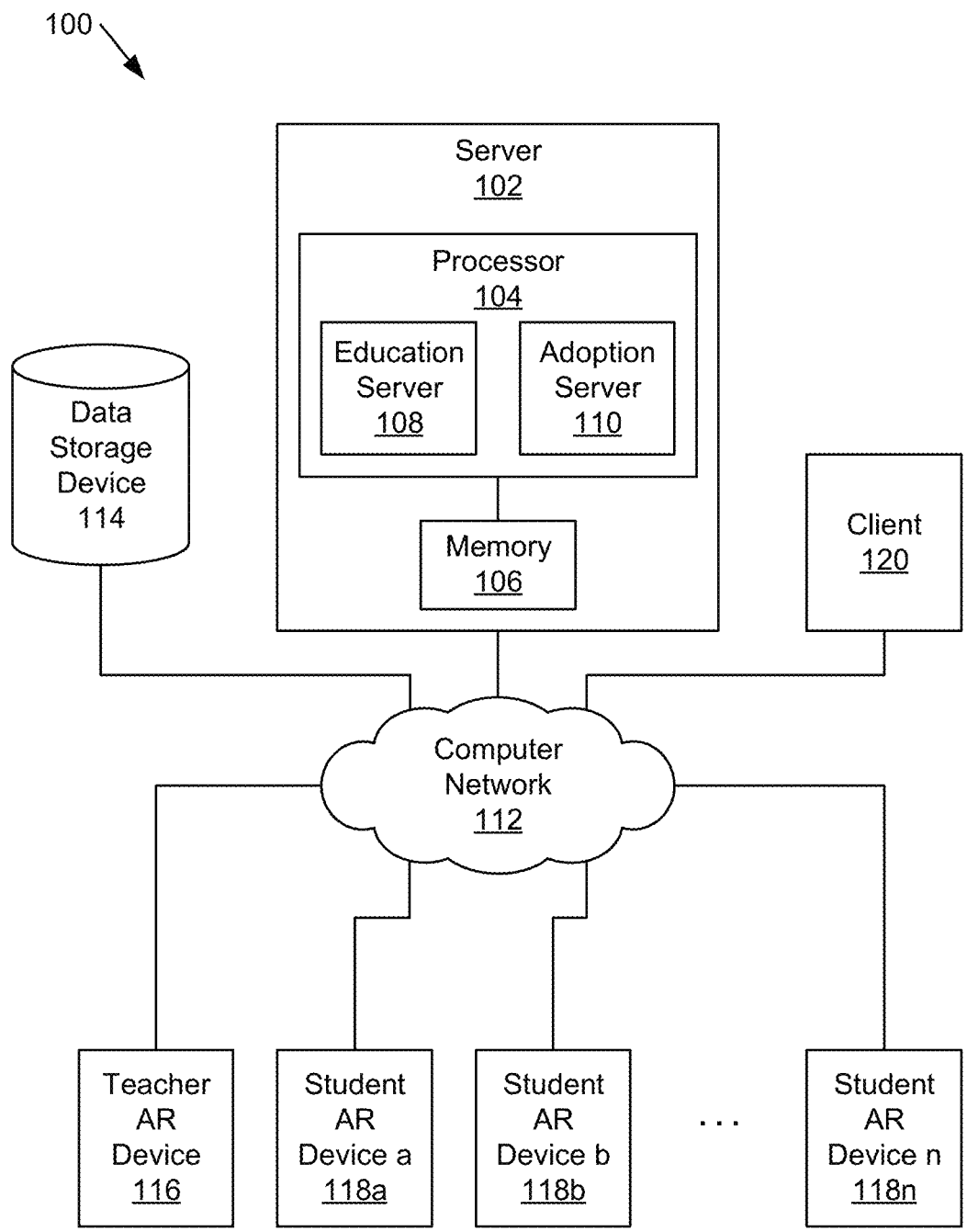
FIG. 1 is a schematic block diagram illustrating one embodiment of a system for personalization of teaching material presented via augmented reality ("AR") devices.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

An apparatus for personalization of teaching material presented via AR devices is disclosed. A computer-implemented method and another apparatus also perform the functions of the apparatus. According to an embodiment of the present invention, the apparatus includes a processor and a memory that stores code executable by the processor. The code executable by the processor includes code to deliver teaching material to an AR device of a teacher in conjunction with the teacher using the teaching material to teach one or more students. The teaching material includes generic teaching material in an unmodified form. The code executable by the processor includes code to create personalized teaching material for a student of the one or more students. The personalized teaching material includes the generic teaching material modified based on learning concepts in a profile of the student that the student has previously experienced. The code executable by the processor includes code to deliver the personalized teaching material to an AR device of the student. The teacher views the generic teaching material in the AR device of the teacher and the student views the personalized teaching material in the AR device of the student.

In some embodiments, the apparatus includes code executable by the processor to store learning concepts previously experienced by the student in the profile of the student. In other embodiments, creating personalized teaching material for a student includes extracting concepts from the teaching material using semantic analysis, aligning concepts extracted from the teaching material with the previously experienced learning concepts in the profile of the student and modifying the generic teaching material to conform to the previously experienced learning concepts.

In other embodiments, the apparatus includes code executable by the processor to deliver a start teaching notification to the teacher in response to personalized teaching material being delivered to each of the one or more students and to enable the teacher to present the teaching material to the one or more students. In other embodiments, the apparatus includes code executable by the processor to synchronize material from the generic teaching material presented by the teacher with corresponding material from the personalized teaching material of each student.

In some embodiments, the apparatus includes code executable by the processor to identify which student of the one or more students is asking a question and to deliver the personalized teaching material of the student asking the question to the AR device of the teacher and to the AR device of each student of the one or more students different than the student asking the question. In other embodiments, the apparatus includes code executable by the processor to identify which student of the one or more students is asking an additional question and to switch the personalized teaching material being delivered to the AR devices of the teacher and the one or more students to deliver the personalized teaching material of the student asking the additional question to the AR device of the teacher and to the AR devices of the students of the one or more students different than the student asking the additional question.

In some embodiments, identifying which student of the one or more students is asking a question includes using speech localization via one or more microphones in a classroom where the student is located, synchronizing lip movement captured by a camera with audio of the question by the student asking the question and/or identifying which microphone of microphones of AR devices of the students has a highest sound level. In other embodiments, identifying which student of the one or more students is asking a question includes processing speech of the question to determine one or more concepts of the question and aligning the concepts of the question with concepts used to personalize the teaching material and identifying the student asking the question based on the alignment of the concepts of the question with previously experienced learning concepts in the profile of the student.

A computer-implemented method includes delivering teaching material to an AR device of a teacher in conjunction with the teacher using the teaching material to teach one or more students. The teaching material includes generic teaching material in an unmodified form. The computer-implemented method includes creating personalized teaching material for a student of the one or more students. The personalized teaching material includes the generic teaching material modified based on learning concepts in a profile of the student that the student has previously experienced. The computer-implemented method includes delivering the personalized teaching material to an AR device of the student. The teacher views the generic teaching material in the AR device of the teacher and the student views the personalized teaching material in the AR device of the student.

In some embodiments, the computer-implemented method includes storing learning concepts previously experienced by the student in the profile of the student. In other embodiments, creating personalized teaching material for a student includes extracting concepts from the teaching material using semantic analysis, aligning concepts extracted from the teaching material with the previously experienced learning concepts in the profile of the student and modifying the generic teaching material to conform to the previously experienced learning concepts. In other embodiments, the computer-implemented method includes delivering a start teaching notification to the teacher in response to personalized teaching material being delivered to each of the one or more students and to enable the teacher to present the teaching material to the one or more students. In other embodiments, the computer-implemented method includes synchronizing material from the generic teaching material presented by the teacher with corresponding material from the personalized teaching material of each student.

In some embodiments, the computer-implemented method includes identifying which student of the one or more students is asking a question and delivering the personalized teaching material of the student asking the question to the AR device of the teacher and to the AR device of the student of the one or more students different than the student asking the question. In other embodiments, the computer-implemented method includes identifying which student of the one or more students is asking an additional question and switching the personalized teaching material being delivered to the AR devices of the teacher and the one or more students to deliver the personalized teaching material of the student asking the additional question to the AR device of the teacher and to the AR device of the students of the one or more students different than the student asking the additional question.

In some embodiments, wherein identifying which student of the one or more students is asking a question includes using speech localization via one or more microphones in a classroom where the student is located, synchronizing lip movement captured by a camera with audio of the question by the student asking the question, and/or identifying which microphone of microphones of AR devices of the students has a highest sound level. In other embodiments, identifying which student of the one or more students is asking a question includes processing speech of the question to determine one or more concepts of the question and aligning the concepts of the question with concepts used to personalize the teaching material and identifying the student asking the question based on the alignment of the concepts of the question with previously experienced learning concepts in the profile of the student.

A computer program product for personalization of teaching material presented via AR devices includes a computer readable storage medium having program instructions embodied therewith. The program instructions are executable by a processor to cause the processor to deliver teaching material to an augmented reality ("AR") device of a teacher in conjunction with the teacher using the teaching material to teach one or more students. The teaching material includes generic teaching material in an unmodified form. The program instructions are executable by a processor to cause the processor to create personalized teaching material for a student of the one or more students. The personalized teaching material includes the generic teaching material modified based on learning concepts in a profile of the student that the student has previously experienced. The program instructions are executable by a processor to cause the processor to deliver the personalized teaching material to an AR device of the student where the teacher views the generic teaching material in the AR device of the teacher and the student views the personalized teaching material in the AR device of the student.

In some embodiments, the computer program product includes code executable by the processor to create personalized teaching material for a student of the one or more students. In other embodiments, the computer program product includes code executable by the processor to store learning concepts previously experienced by the student in the profile of the student. In other embodiments, the computer program product includes code executable by the processor to identify which student of the one or more students is asking a question, and deliver the personalized teaching material of the student asking the question to the AR device of the teacher and to the AR device of the student of the one or more students different than the student asking the question.

FIG. 1 is a schematic block diagram illustrating one embodiment of a system 100 for personalization of teaching material presented via augmented reality ("AR") devices. The system includes a server 102 with a processor 104, memory 106, an education server 108, an adoption server 110, a computer network 112, a data storage device 114, an AR device 116 of a teacher, AR devices 118a-n (collectively or generically "118"), and a client 120, which are described below.

The system 100 includes a server 102 that includes a processor 104 and memory 106. The server 102, in some embodiments, includes a rack-mounted computer, a mainframe computer, a desktop computer, a workstation, a laptop computer, or other computing device with a processor 104 and memory 106. In some embodiments, the server 102 includes multiple processors 104 and may include various levels of memory 106. For example, the server 102 may be part of a cloud computing system and may be a virtual server on a virtual machine ("VM") running on one or more processors 104. In other embodiments, the server 102 is set up on a single computing device accessible to a teacher for accessing teaching material and other data relevant to the teacher. The server 102 is a computer accessible by a teacher and that stores teaching material and/or student profiles.

The processor 104, in some embodiments, includes an education server 108 and/or an adoption server 110 running on the processor 104. In some embodiments, the education server 108 facilitates delivery and management of teaching material to AR devices 116, 118 of the teacher and students. In some embodiments, the processor includes an adoption server 110 that creates personalized teaching material for students based on learning concepts in a profile of the student that the student has previously experienced.

The system 100 includes a computer network 112 that connects the server 102 with the AR device 116 of the teacher, AR devices 118 of students, one or more data storage devices 114, a client 120, and the like. The computer network 112 includes one or more networks capable of transmission of data between devices. In some embodiments, the computer network 112 is a combination of networks. The computer network 112 may include a local area network ("LAN"), a wide area network ("WAN"), a fiber network, a wireless connection, the Internet, a storage area network ("SAN"), and the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application. One of skill in the art will recognize other implementations of the computer network 112.

The system 100 includes one or more data storage devices 114, which, in some embodiments, store teaching material, student profiles, computer instructions, and the like. In some embodiments, the one or more data storage devices 114 are part of a SAN. In other embodiments, the data storage device(s) 114 are part of the computing device that includes the server 102. In other embodiments, the data storage device(s) 114 are rack mounted. One of skill in the art will recognize other ways to implement one or more data storage devices 114 to facilitate data storage accessible to the server 102.

The system 100 includes an AR device 116 of a teacher and AR devices 118 of students. The AR devices 116, 118, in some embodiments, are devices that fit on a user's head and cover the eyes or are in front of the eyes of a user and include one or more displays that present an augmented reality environment. In some embodiments, the AR devices 116, 118 include a microphone and/or a camera(s). The AR devices 116, 118 may use the camera(s) to receive surroundings of the user and interleave all or part of the surroundings of the user with material input to the AR devices 116, 118. Typically, augmented reality is an interactive experience of a real-world environment where the objects that reside in the real-world surrounding a user are "augmented" by computer-generated perceptual information, sometimes across multiple senses, including visual, auditory, haptic, and the like. The overlaid sensory information, in some embodiments, is additive to the natural environment and in some embodiments, masks all or part of the natural environment.

In some embodiments, the AR devices 116, 118 present an augmented reality environment and in other embodiments, the AR devices 116, 118 present a virtual reality environment where the surroundings of the students and/or teacher are masked and replaced. For example, the AR devices 116, 118 may present an augmented reality for portions of a lesson and virtual reality for a particular learning experience during the lesson. One of skill in the art will recognize other functions and requirements for an AR device 116, 118 for using in presenting personalized teaching material to students and to a teacher.

The system 100 includes one or more clients 120 (represented by a single client 120 in FIG. 1). A teacher, student or other user, in some embodiments, interact with the server 102 or a client 120 to input and/or access teaching material, student profiles, computer instructions for presenting the teaching material, and the like. One of skill in the art will recognize how a teacher, a student, etc. can use a client 120 in conjunction with presenting personalized teaching material to the students and/or a teacher.

The server 102 includes memory 106. The memory may be persistent and/or non-persistent. The memory 106 may be random access memory ("RAM"), read only memory ("ROM"), flash memory, cache, or the like. In some embodiments, the processor 104 loads the memory 106 with code executable by the processor 104 and/or data. In some embodiments, the processor 104 accesses the memory 106 to execute the code and accesses the data as necessary.

In some embodiments, the system 100 includes an apparatus with the processor 104 and memory 106 where the memory 106 includes code executable by the processor 104 to deliver teaching material to the AR device 116 of a teacher in conjunction with the teacher using the teaching material to teach one or more students. The teaching material includes generic teaching material in an unmodified form. In some embodiments, the education server 108 running on the processor 104 delivers the generic teaching material to the AR device 116 of the teacher.

In some embodiments, the teacher selects teaching material that may be stored on a data storage device 114 for instruction of the students. The education server 108 executes code in the memory 106 to deliver generic teaching material to the AR device 116 of the teacher. The generic teaching material, in some embodiments, is in a same form as accessed by the teacher. In other embodiments, the generic teaching material is in a form appropriate for the AR device 116 of the teacher, but does not include personalization information.

In some embodiments of the apparatus, the memory 106 includes code executable by the processor 104 to create personalized teaching material for a student of the one or more students. The personalized teaching material includes the generic teaching material modified based on learning concepts in a profile of the student that the student has previously experienced. In some embodiments, the adoption server 110 accesses the teaching material and the student profile and creates the personalized teaching material.

In some embodiments, the apparatus keeps track of concepts learned by the student, concepts that the student focused upon, concepts that the student paid particular interest, etc. For example, the student may have received previous instruction through an AR device 118 or without an AR device 118 and the student may have interacted with teaching material presented in the instruction, may have done further research based on the teaching material, etc. and the education server 108 or other device tracked concepts of the teaching material or concepts focused upon by the student. The apparatus, through the adoption server 110 or other device, then creates personalized teaching material for a current lesson based on the stored concepts. One of skill in the art will recognize other ways to track and store in a student profile one or more concepts that the student has previously experienced.

In some embodiments of the apparatus, the memory 106 includes code executable by the processor 104 to deliver the personalized teaching material to an AR device 118 of the student where the teacher views the generic teaching material in the AR device 116 of the teacher and the student views the personalized teaching material in the AR device 118 of the student. Thus, the learning experience of each student is enhanced by experiencing the personalized teaching material geared to that student so that the learning experience becomes more personal and the student is more apt to pay attention to the personalized teaching material.

In some embodiments of the apparatus, the memory 106 includes code executable by the processor 104 to store learning concepts previously experienced by the student in the profile of the student. For example, the education server 108 may track and store concepts previously experienced by the student through previous lessons, through study by the student, through interaction with the concepts while ignoring other concepts, etc.

In other embodiments of the apparatus, creating personalized teaching material for a student includes extracting concepts from the teaching material using semantic analysis, aligning concepts extracted from the teaching material with the previously experienced learning concepts in the profile of the student and modifying the generic teaching material to conform to the previously experienced learning concepts.

For some examples, semantic analysis is used to extract concepts from the student profile by identifying topics, subjects, key words, etc. which are then used to identify the concepts of the previously experienced learning concepts. The teaching material, in some embodiments, includes concepts previously extracted which can be readily compared to the concepts from the student profile. In other embodiments, the adoption server 110 or other device of the apparatus uses semantic analysis to extract concepts from the teaching material.

In some embodiments, modifying the generic teaching material to conform to the previously experienced learning concepts includes adding additional content to the generic teaching material. In other embodiments, modifying the generic teaching material to conform to the previously experienced learning concepts includes modifying and/or replacing concepts in the generic teaching material with concepts from the learning concepts in a profile of the student that the student has previously experienced.

In some embodiments of the apparatus, the memory 106 includes code executable by the processor 104 to deliver a start teaching notification to the teacher in response to personalized teaching material being delivered to each of the one or more students. The start teaching notification, in some embodiments, is a message that appears in the AR device 116 of the teacher, a sound, an audible message, or the like. In other embodiments, the memory 106 includes code executable by the processor 104 to enable the teacher to present the teaching material to the one or more students. In some examples, the generic teaching material and the personalized teaching material are controlled by the educational server 106 which locks the teaching material, restricts access to the teaching material, etc. to prevent the teacher from presenting the teaching material until all of the personalized teaching material is delivered to the students. One of skill in the art will recognize other ways to enable presentation of the teaching material to the students.

In some embodiments, embodiments of an apparatus described above include a processor 104 and memory 106 with executable code to perform the functions described above. In other embodiments, embodiments of and apparatus described above include the education server 108 and/or adoption server 110 running on a processor 104 and the education server 108 and adoption server 110 retrieve data and/or instructions from the memory 106 and/or one or more data storage devices 114. One of skill in the art will recognize other forms of an apparatus for personalization of teaching material presented via AR devices 116, 118.

Figure 2:
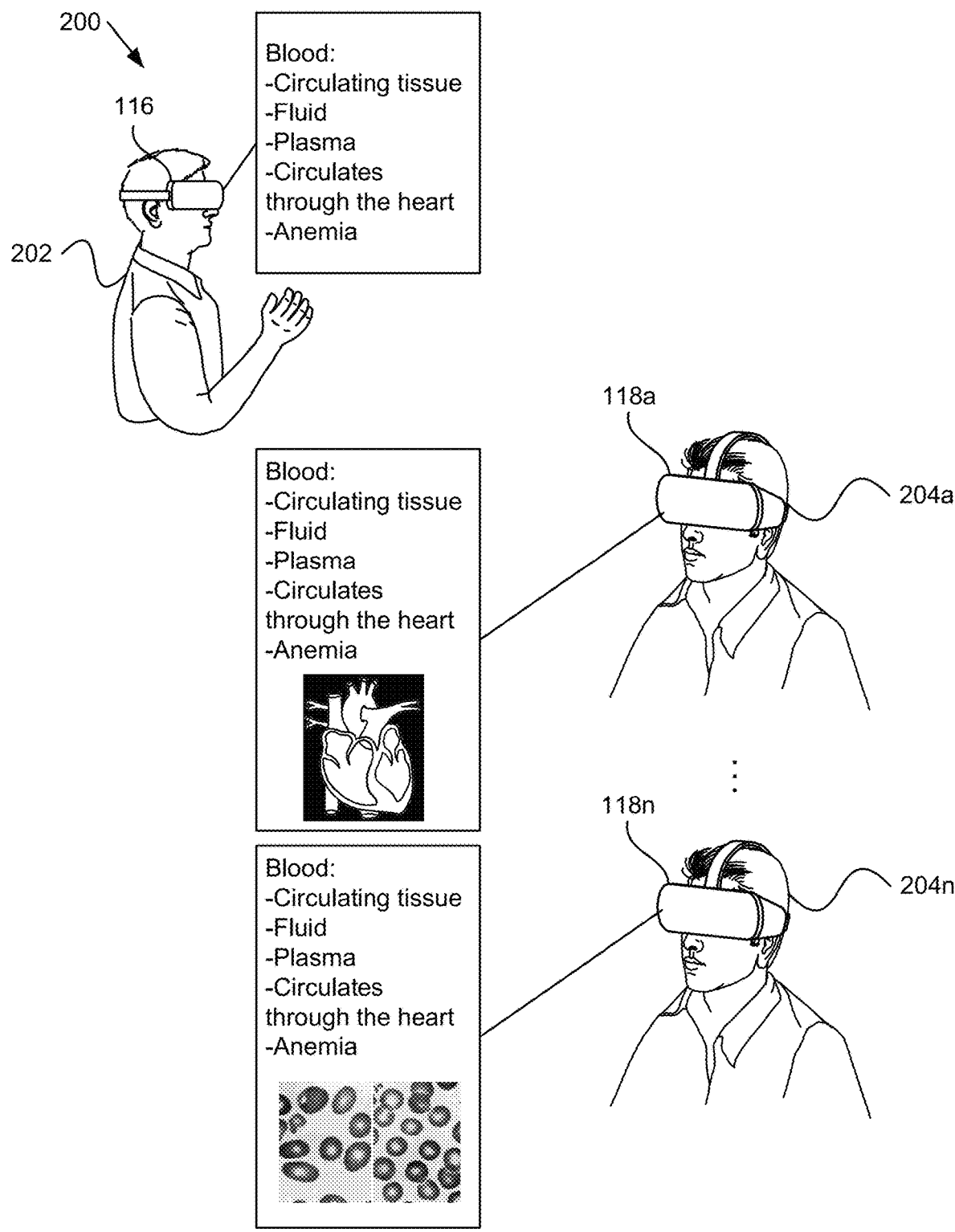
FIG. 2 is a diagram illustrating a teacher with generic teaching material visible in an AR device and students with personalized teaching material visible in the AR devices of the students.

FIG. 2 is a diagram 200 illustrating a teacher 202 with generic teaching material visible in an AR device 116 of the teacher 202 and students 204*a-n* with personalized teaching material visible in the AR devices 118 of the students 204*a-n*. In the diagram 200, a topic of the teaching material is functions of blood. In the diagram 200, the generic teaching material displayed in the AR device 116 of the teacher 202 includes the topics "circulating tissue," "fluid," "plasma," "circulates through the heart" and "anemia." Typically, the teaching material would include additional material, such as text, diagrams, videos, etc. and only a small list is depicted in FIG. 2 for clarity. The personalized teaching material displayed in the AR device 118*a* of a first student 204*a* includes the generic teaching material plus a diagram of a heart. In the example, the first student 204*a* paid attention to a heart, which is related to blood so the personalized teaching material of the first student 204*a* includes the diagram of a heart. The $n^{th}$ student 204*n* displayed an interest in previous instruction to anemia so the personalized teaching material displayed in the AR device 118*n* of the $n^{th}$ student includes 204*n* a diagram illustrating normal blood and anemic blood in addition to the generic teaching material.

In some embodiments of the apparatus, the memory 106 includes code executable by the processor 104 to synchronize material from the generic teaching material presented by the teacher with corresponding material from the personalized teaching material of each student. For example, the education server 108, in some embodiments, displays a same portion of the generic teaching material and the personalized teaching material to the AR device 116 of the teacher and the AR devices 118 of the students. In some embodiments, synchronizing presenting of the generic teaching material and the personalized teaching material is approximated due to differences between the generic and personalized teaching material. For example, the education server 108 may simultaneously display information about plasma in the generic teaching material displayed in the AR device 116 of the teacher and the personalized teaching material displayed in the AR devices 118 of the students. The AR devices 118 of the students may also include personalized information.

Figure 3:
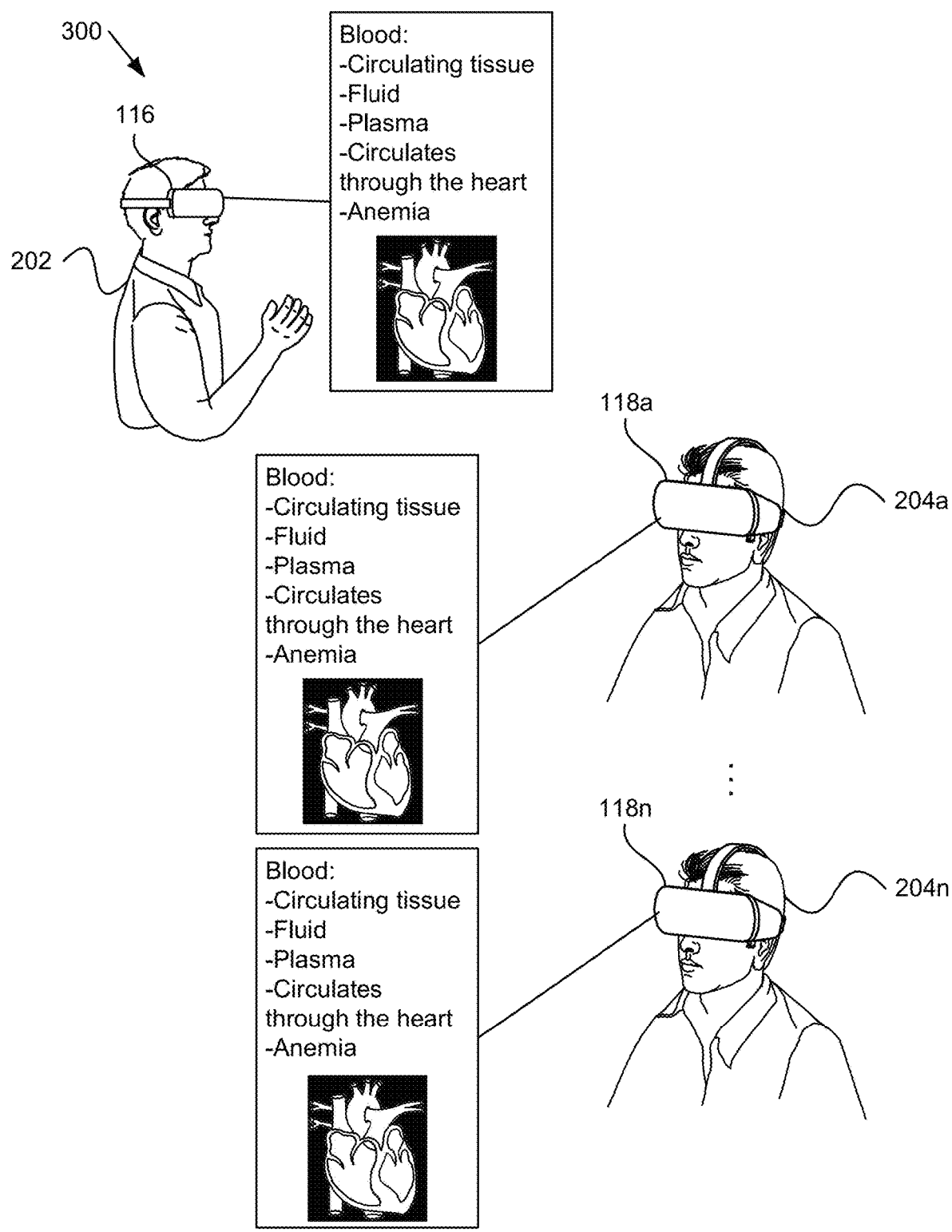
FIG. 3 is a diagram illustrating a teacher and students with personalized teaching material of a student with a question visible in the AR devices of the teacher and students.

FIG. 3 is a diagram 300 illustrating a teacher 202 and students 204*a*, 204*n* with personalized teaching material of a student (e.g. the first student 204*a*) with a question visible in the AR devices 116, 118 of the teacher 202 and students 204*a-n*. In some embodiments of the apparatus, the memory 106 includes code executable by the processor 104 to identify which student (e.g. the first student 204*a*) of the one or more students 204*a-n* is asking a question and to deliver the personalized teaching material of the first student 204*a* asking the question to the AR device 116 of the teacher 202 and to the AR device 118 of each student 204*b-n* of the one or more students different than the student 204*a* asking the question. Thus, the other students and teacher view the personalized teaching material of the first student 204*a* asking the question, which is beneficial to understand the context of the question of the first student 204*a*.

To identify which student (e.g. 204*a*) is asking a question, the apparatus may include executable code to employ various techniques of determining which student 204*a* asked the question. For example, identifying which student 204*a* of the one or more students 204 is asking a question may include using speech localization via one or more microphones in a classroom where the student 204*a* is located. In another embodiment, identifying which student 204*a* of the one or more students 204 is asking a question may include synchronizing lip movement captured by a camera with audio of the question by the student 204*a* asking the question.

In other embodiments, identifying which student 204*a* of the one or more students 204 is asking a question includes identifying which microphone of microphones of AR devices 118 of the students 204 has a highest sound level. In other embodiments, identifying which student 204*a* of the one or more students 204 is asking a question includes processing speech of the question to determine one or more concepts of the question and aligning the concepts of the question with concepts used to personalize the teaching material and identifying the student 204*a* asking the question based on the alignment of the concepts of the question with previously experienced learning concepts in the profile of the student 204*a*. In other embodiments, identifying which student 204*a* of the one or more students 204 is asking a question includes the teacher 202 identifying the student 204*a* asking the question and entering a command to select the personalized teaching material of the student 204a to display on the AR devices 116, 118. One of skill in the art will recognize other ways to identifying which student 204a of the one or more students 204 is asking a question.

After the teacher 202 and/or other students 204b-n respond to the question, another student (e.g. the $n^{th}$ student 204n) may have a question. In some embodiments of the apparatus, the memory 106 includes code executable by the processor 104 to identify which student (e.g. the $n^{th}$ student 204n) of the one or more students is asking an additional question, and to switch the personalized teaching material being delivered to the AR devices 116, 118 of the teacher 202 and the one or more students 204a-n to deliver the personalized teaching material of the student 204n asking the additional question to the AR devices 116, 118 of the teacher 202 and students 204. For example, the display regarding anemia and the generic teaching material may be displayed on the AR devices 116, 118 of the teacher 202 and students 204.

After the teacher 202 and/or students 204 answer a question, in some embodiments of the apparatus, the memory 106 includes code executable by the processor 104 to change the teaching material of the AR devices 116, 118 so the generic teaching material is again displayed in the AR device 116 of the teacher 202 and so personalized teaching material of each student 204 is again displayed in the AR device 118 of the student 204. This enables the teacher 202 to continue on with the lesson while the students 204 are again presented with personalized teaching material in their AR devices 118.

Figure 4:
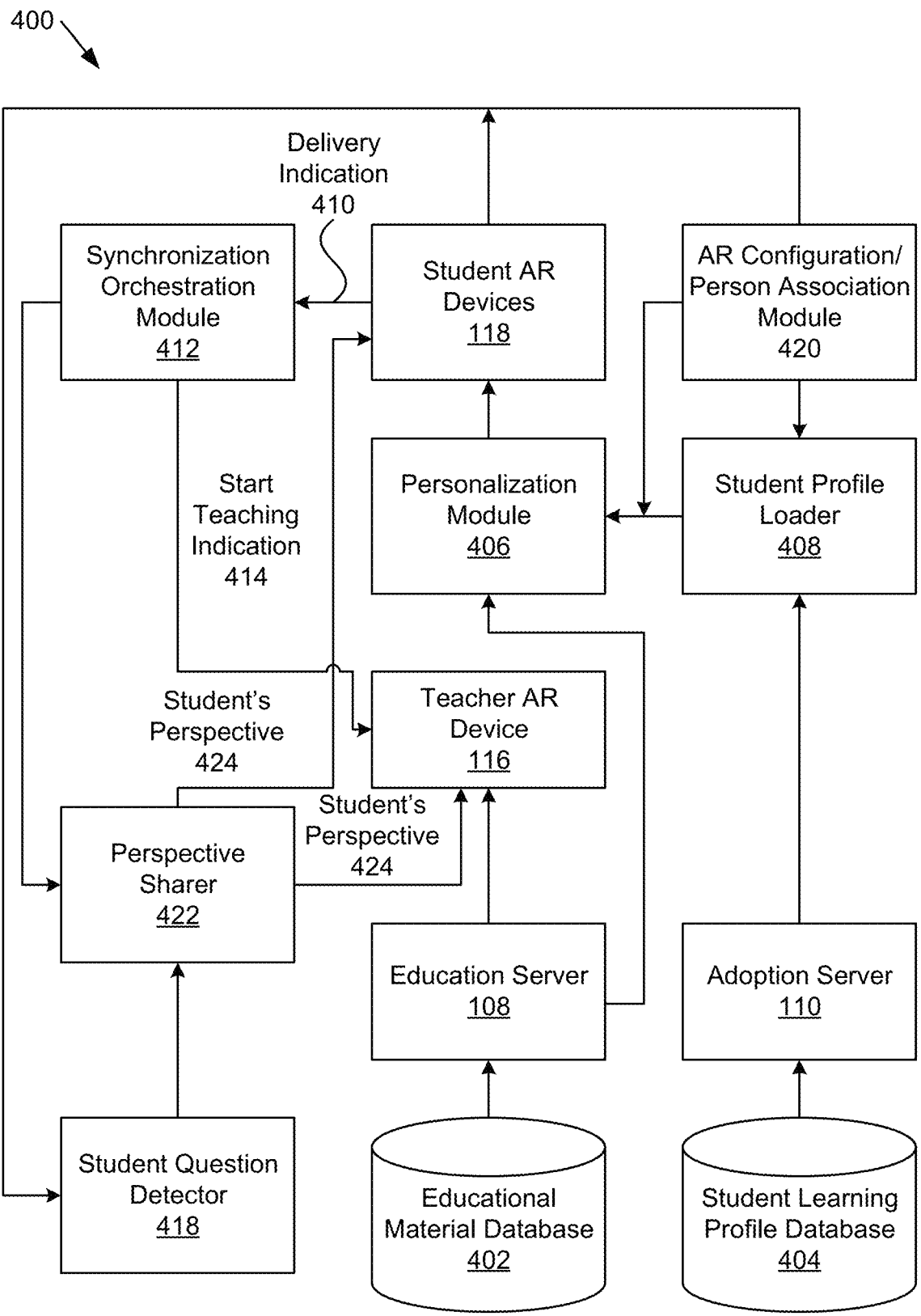
FIG. 4 is a schematic block diagram illustrating one embodiment of a system flow chart diagram for personalization of teaching material presented via AR devices.

FIG. 4 is a schematic block diagram illustrating one embodiment of a system flow chart diagram 400 for personalization of teaching material presented via AR devices. The education server 108 retrieves teaching material from an educational database 402, that may be in one or more data storage devices 114. The adoption server 110 retrieves learning concepts from one or more student profiles in a student learning profile database 404, which may also be in one or more data storage devices 114. In some embodiments, concepts experienced by a student are stored in the student's profile in the student learning profile database 404. The teaching material is transferred from the education server 108 to the AR device 116 of the teacher 202 as generic teaching material. The personalization module 406 receives the teaching material from the education server 108 along with learning concepts from a student's profile from the student profile loader 408. The personalization module 406 creates personalized teaching material for a particular student and loads the personalized teaching material into a the AR device (e.g. 118a) of the student 204a.

Once the personalized teaching material for each student 204 has been loaded into the individual AR devices 118 of the students 204 and each AR device 118 has provided a delivery indication 410, a synchronization orchestration module 412 sends a start teaching indication 414 to the AR device 116 of the teacher 202. A student question detector 416 receives information from the AR devices 118 of the students 204, which indicate which students are present, identification of the students, etc. and information from an AR configuration/person association module 420, which correlates information from a student profile with a student (e.g. 204a).

The student question detector 418 uses various sensor data, student identification data, student profile data, etc. to identify which student is asking a question. Once the student question detector 418 has identified which student has a question, the perspective sharer 422 shares the personalized teaching profile of the student asking the question with the AR device 116 of the teacher 202 and the AR devices 118 of all of the students 204 see the personalized teaching material of the student 204a from the student's perspective 424. Once the question has been answered, the AR device of the teacher 202 again displays the generic teaching material and the AR devices 118 of the students 204 each display their own personalized teaching material. The question process repeats for an additional question.

Figure 5:
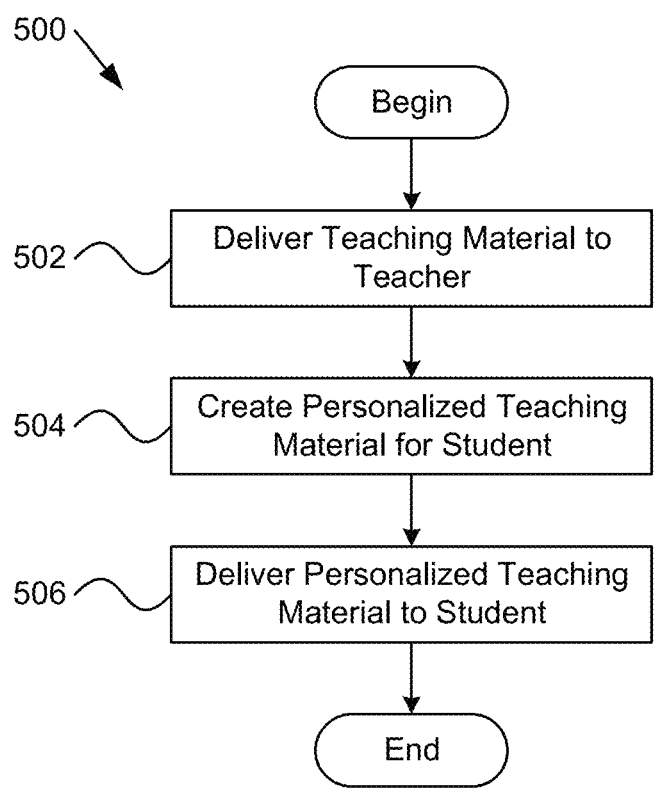
FIG. 5 is a schematic flow chart diagram illustrating one embodiment of a method for personalization of teaching material presented via AR devices.

FIG. 5 is a schematic flow chart diagram illustrating one embodiment of a method 500 for personalization of teaching material presented via AR devices 116, 118. The method 500 begins and delivers 502 teaching material to an AR device 116 of a teacher 202 in conjunction with the teacher 202 using the teaching material to teach one or more students 204. The teaching material includes generic teaching material in an unmodified form. The method 500 creates 504 personalized teaching material for at least one student (e.g. 204a) of the one or more students 204. The personalized teaching material includes the generic teaching material modified based on learning concepts in a profile of the student 204a that the student 204a has previously experienced.

The method 500 delivers 506 the personalized teaching material to an AR device 118a of the student 204a, and the method 500 ends. The teacher 202 views the generic teaching material in the AR device 116 of the teacher 202 and the student 204a views the personalized teaching material in the AR device 118a of the student 204a. In various embodiments, the apparatus described above with a processor 104 and memory 106 with code executable by the processor 104 executes the steps of the method 500.

Figure 6:
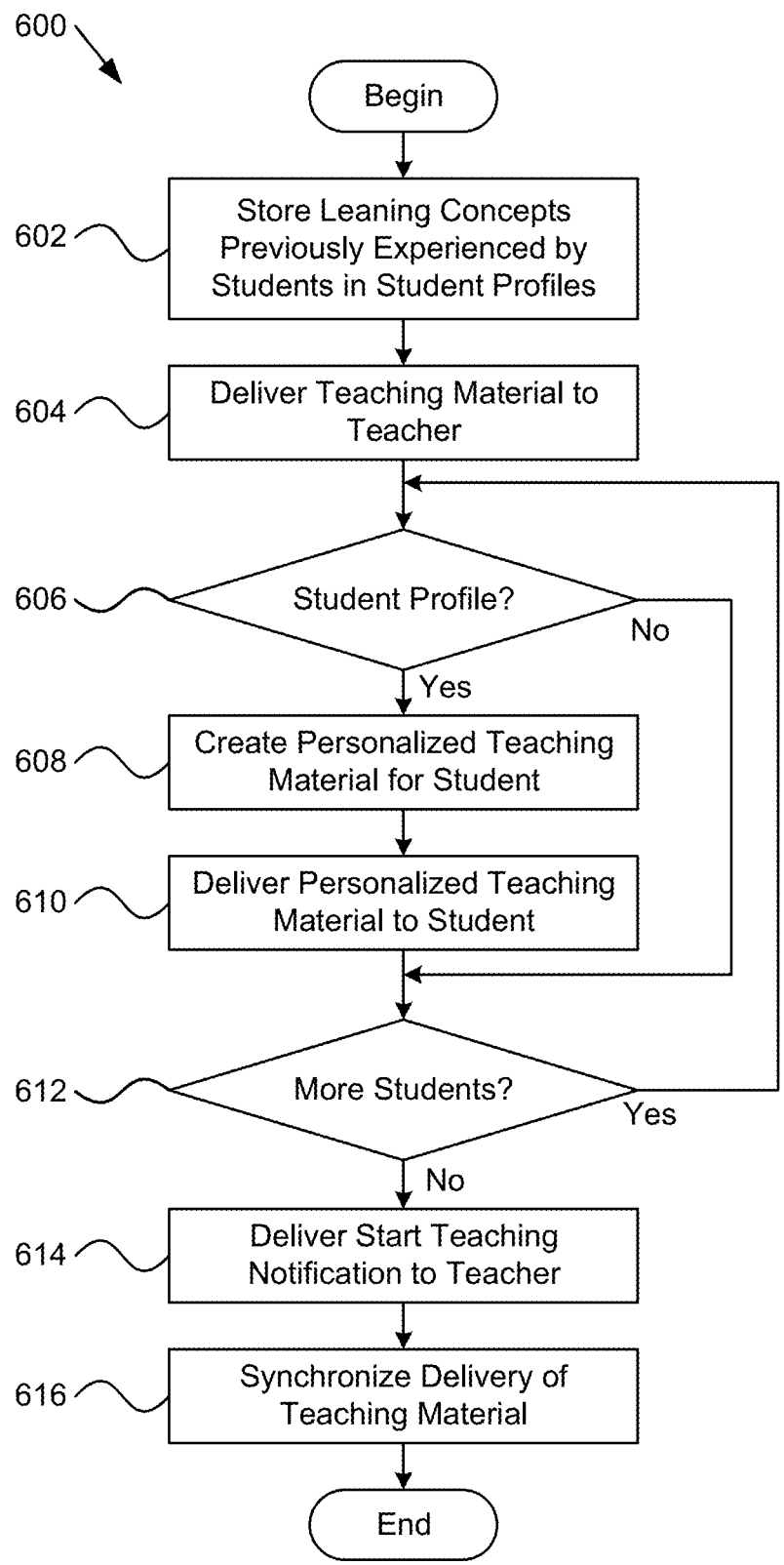
FIG. 6 is a schematic flow chart diagram illustrating another embodiment of a method for personalization of teaching material presented via AR devices.

FIG. 6 is a schematic flow chart diagram illustrating another embodiment of a method 600 for personalization of teaching material presented via AR devices 116, 118. The method 600 begins and stores 602 learning concepts previously experienced by a student (e.g. the first student 204a) in the profile of the student 204a. The method 600, in some embodiments, repeats storing 602 learning concepts for each student 204. The method 600 delivers 604 teaching material to an AR device 116 of a teacher 202 in conjunction with the teacher 202 using the teaching material to teach one or more students 204. The teaching material includes generic teaching material in an unmodified form.

The method 600 determines 606 if a student (e.g. 204a) has a student profile with learning concepts that the student 204a has previously experienced that align with concepts of the teaching material. If the method 600 determines 606 that the student 204a has a student profile with learning concepts that the student 204a has previously experienced that align with concepts of the teaching material, the method 600 creates 608 personalized teaching material for the student 204a and delivers 610 the personalized teaching material to the AR device 118a of the student 204a.

The method 600 then determines 612 if there are more students (e.g. 204b-n). If the method 600 determines 612 that there are more students (e.g. a second student 204b), the method 600 returns and determines 606 if the student 204b has a student profile with learning concepts that the student 204b has previously experienced that align with concepts of the teaching material. If the method 600 determines 606 that there is not a student profile for a student 204 with learning concepts that the student 204 has previously experienced that align with concepts of the teaching material, the method 600 skips forward and determines 612 if there are more students (e.g. 204b-n).

If the method 600 determines 612 that there are no more students to evaluate, the method 600 delivers 614 a start teaching notification to the teacher 202. The method 600, in some embodiments, synchronizes 616 delivery of the generic teaching material to the AR device 116 of the teacher 202 with delivery of the personalized teaching material to the AR devices 118 of the students 204, and the method 600 ends. In various embodiments, the apparatus described above with a processor 104 and memory 106 with code executable by the processor 104 executes the steps of the method 600.

Figure 7:
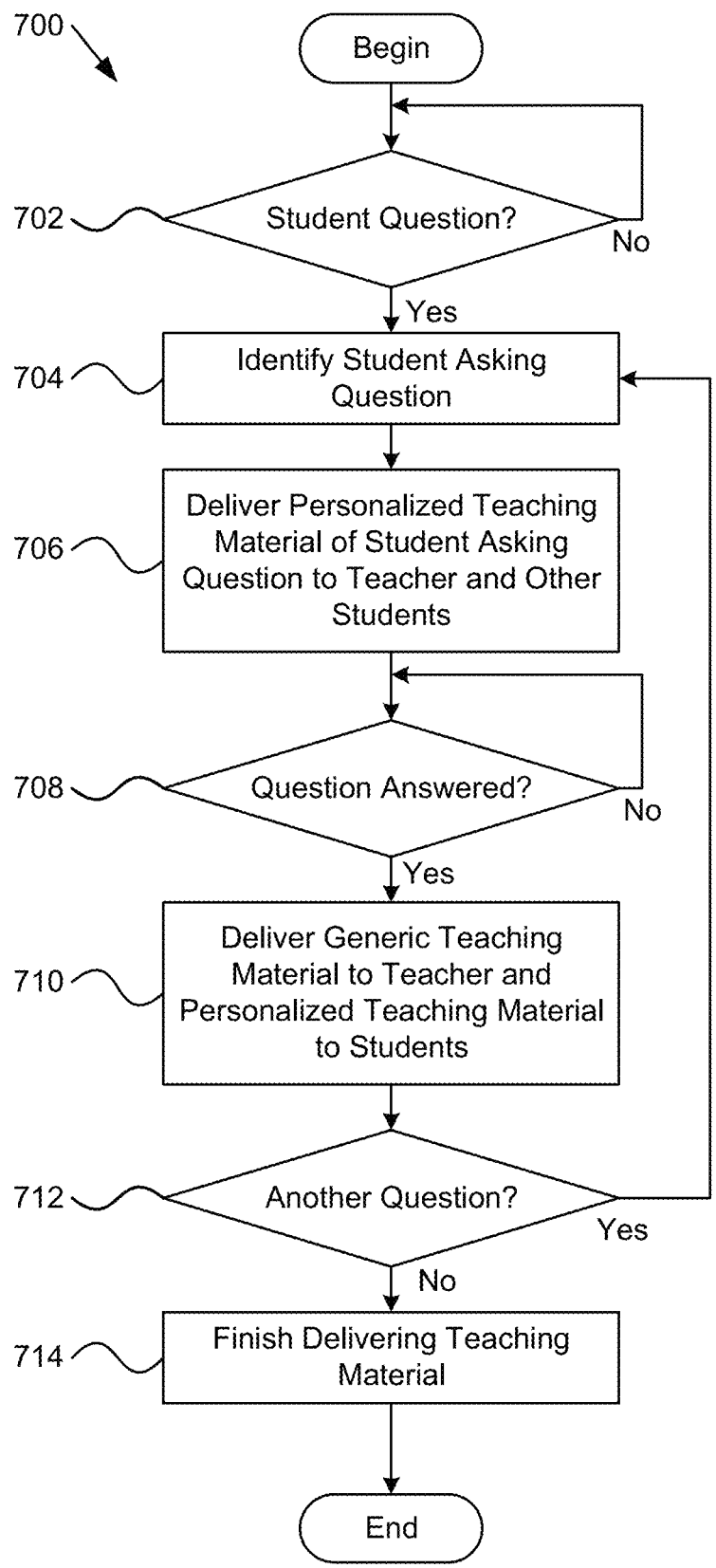
FIG. 7 is a schematic flow chart diagram illustrating one embodiment of a method for displaying personalized teaching material of a student with a questions in the AR devices of a teacher and students.

FIG. 7 is a schematic flow chart diagram illustrating one embodiment of a method 700 for displaying personalized teaching material of a student (e.g. 204a) with a questions in the AR devices 116, 118 of a teacher 202 and students 204. The method 700 begins and determines 702 if a student 204 has a question. If the method 700 determines 702 that a student 204 does not have a question, the method 700 returns and continues to determine 702 if a student 204 has a question while the teacher 202 is presenting the teaching material. If the method 700 determines 702 that a student 204 has a question, the method 700 identifies 704 the student (e.g. 204a) asking the question. The method 700 delivers 706 the personalized teaching material of the student 204a asking the question to the AR device 116 of the teacher 202 and to the AR device 118b-n of each student 204b-n of the one or more students 204 different than the student 204 asking the question.

The method 700 determines 708 if the question has been answered. If the method 700 determines 708 that the question has not been answered, the method 700 returns and continues to determine 708 if the question has been answered while delivering 706 and displaying the personalized teaching material of the student 204a asking the question to the AR device 116 of the teacher 202 and to the AR device 118b-n of each student 204b-n of the one or more students 204 different than the student 204 asking the question. If the method 700 determines 708 that the question has been answered, the method 700 delivers 710 generic teaching material to the AR device 116 of the teacher 202 and personalized teaching material of each individual student 204 to the AR device 118 of the student 204.

For example, based on natural language processing of speech between the student 204a asking the question and teacher 202, the method 700 may determine 708 that the question has been answered by looking for a phrase like "does that answer your question" and the student 204a responding with "yes." In another example, the method 708 determines that the question has been answered using natural language processing by determining that another topic is being discussed by the teacher 202 or students 204. In another example, the teacher 202 may determine that the question has been answered and may issue a command to the education server 108 indicating that the question has been answered. In another example, the method 700 determines 708 that the question has been answered by receiving an indication from the student 204a with the question that the question has been answered. One of skill in the art will recognize other ways for the method 700 to determine whether or not the question has been answered.

The method 700 determines 712 if there is another question from a student 204. If the method 700 determines 712 that there is another question from a student, the method 700 returns and identifies the student (e.g. a second student 204b) and delivers 706 personalized teaching material of the second student 204b to the AR device of the teacher 202 and to the AR devices 118a,c-n of the other students 204a,c-n. If the method 700 determines 712 that there is not another question, the method 700 finishes 714 delivering the teaching material, as directed by the teacher 202, and the method 700 ends. In various embodiments, the apparatus described above with a processor 104 and memory 106 with code executable by the processor 104 executes the steps of the method 700.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
   a processor; and
   a memory that stores code executable by the processor to:
   deliver teaching material to an augmented reality ("AR") device of a teacher in conjunction with the teacher using the teaching material to teach one or more students, the teaching material comprising generic teaching material in an unmodified form;
   create personalized teaching material for a student of the one or more students, the personalized teaching material comprising the generic teaching material modified based on learning concepts in a profile of the student that the student has previously experienced;
   deliver the personalized teaching material to an AR device of the student,
   wherein the teacher views the generic teaching material in the AR device of the teacher and the student views the personalized teaching material in the AR device of the student;
   identify which student of the one or more students is asking a question; and
   deliver the personalized teaching material of the student asking the question to the AR device of the teacher and to the AR device of each student of the one or more students different than the student asking the question.

2. The apparatus of claim 1, further comprising code executable by the processor to store learning concepts previously experienced by the student in the profile of the student.

3. The apparatus of claim 1, wherein creating personalized teaching material for a student comprises extracting concepts from the teaching material using semantic analysis, aligning concepts extracted from the teaching material with the previously experienced learning concepts in the profile of the student and modifying the generic teaching material to conform to the previously experienced learning concepts.

4. The apparatus of claim 1, further comprising code executable by the processor to deliver a start teaching notification to the teacher in response to personalized teaching material being delivered to each of the one or more students and to enable the teacher to present the teaching material to the one or more students.

5. The apparatus of claim 4, further comprising code executable by the processor to synchronize material from the generic teaching material presented by the teacher with corresponding material from the personalized teaching material of each student.

6. The apparatus of claim 1, further comprising code executable by the processor to:
identify which student of the one or more students is asking an additional question; and
switch the personalized teaching material being delivered to the AR devices of the teacher and the one or more students to deliver the personalized teaching material of the student asking the additional question to the AR device of the teacher and to the AR devices of the students of the one or more students different than the student asking the additional question.

7. The apparatus of claim 1, wherein identifying which student of the one or more students is asking a question comprises one or more of:
using speech localization via one or more microphones in a classroom where the student is located;
synchronizing lip movement captured by a camera with audio of the question by the student asking the question;
identifying which microphone of microphones of AR devices of the students has a highest sound level; and
processing speech of the question to determine one or more concepts of the question and aligning the concepts of the question with concepts used to personalize the teaching material and identifying the student asking the question based on the alignment of the concepts of the question with previously experienced learning concepts in the profile of the student.

8. A computer-implemented method comprising:
delivering teaching material to an augmented reality ("AR") device of a teacher in conjunction with the teacher using the teaching material to teach one or more students, the teaching material comprising generic teaching material in an unmodified form;
creating personalized teaching material for a student of the one or more students, the personalized teaching material comprising the generic teaching material modified based on learning concepts in a profile of the student that the student has previously experienced;
delivering the personalized teaching material to an AR device of the student,
wherein the teacher views the generic teaching material in the AR device of the teacher and the student views the personalized teaching material in the AR device of the student;
identifying which student of the one or more students is asking a question; and
delivering the personalized teaching material of the student asking the question to the AR device of the teacher and to the AR device of the student of the one or more students different than the student asking the question.

9. The computer-implemented method of claim 8, further comprising storing learning concepts previously experienced by the student in the profile of the student.

10. The computer-implemented method of claim 8, wherein creating personalized teaching material for a student comprises extracting concepts from the teaching material using semantic analysis, aligning concepts extracted from the teaching material with the previously experienced learning concepts in the profile of the student and modifying the generic teaching material to conform to the previously experienced learning concepts.

11. The computer-implemented method of claim 8, further comprising delivering a start teaching notification to the teacher in response to personalized teaching material being delivered to each of the one or more students and to enable the teacher to present the teaching material to the one or more students.

12. The computer-implemented method of claim 8, further comprising synchronizing material from the generic teaching material presented by the teacher with corresponding material from the personalized teaching material of each student.

13. The computer-implemented method of claim 8, further comprising:
identifying which student of the one or more students is asking an additional question; and
switching the personalized teaching material being delivered to the AR devices of the teacher and the one or more students to deliver the personalized teaching material of the student asking the additional question to the AR device of the teacher and to the AR device of the students of the one or more students different than the student asking the additional question.

14. The computer-implemented method of claim 8, wherein identifying which student of the one or more students is asking a question comprises one or more of:
using speech localization via one or more microphones in a classroom where the student is located;
synchronizing lip movement captured by a camera with audio of the question by the student asking the question;
identifying which microphone of microphones of AR devices of the students has a highest sound level; and
processing speech of the question to determine one or more concepts of the question and aligning the concepts of the question with concepts used to personalize the teaching material and identifying the student asking the question based on the alignment of the concepts of the question with previously experienced learning concepts in the profile of the student.

15. A computer program product comprising a computer readable storage medium having program instructions embodied therewith, the program instructions executable by a processor to cause the processor to:
deliver teaching material to an augmented reality ("AR") device of a teacher in conjunction with the teacher using the teaching material to teach one or more students, the teaching material comprising generic teaching material in an unmodified form;
create personalized teaching material for a student of the one or more students, the personalized teaching material comprising the generic teaching material modified based on learning concepts in a profile of the student that the student has previously experienced;
deliver the personalized teaching material to an AR device of the student,
wherein the teacher views the generic teaching material in the AR device of the teacher and the student views the personalized teaching material in the AR device of the student;
identify which student of the one or more students is asking a question; and
deliver the personalized teaching material of the student asking the question to the AR device of the teacher and to the AR device of the student of the one or more students different than the student asking the question.

16. The computer program product of claim 15, further comprising code executable by the processor to store learning concepts previously experienced by the student in the profile of the student.

* * * * *